July 24, 1962 A. M. LEITZEL 3,046,187
APPARATUS AND METHOD FOR MAKING MOLDED PULP
ARTICLES HAVING HOLES THERETHROUGH
Filed Nov. 3, 1958 3 Sheets-Sheet 2
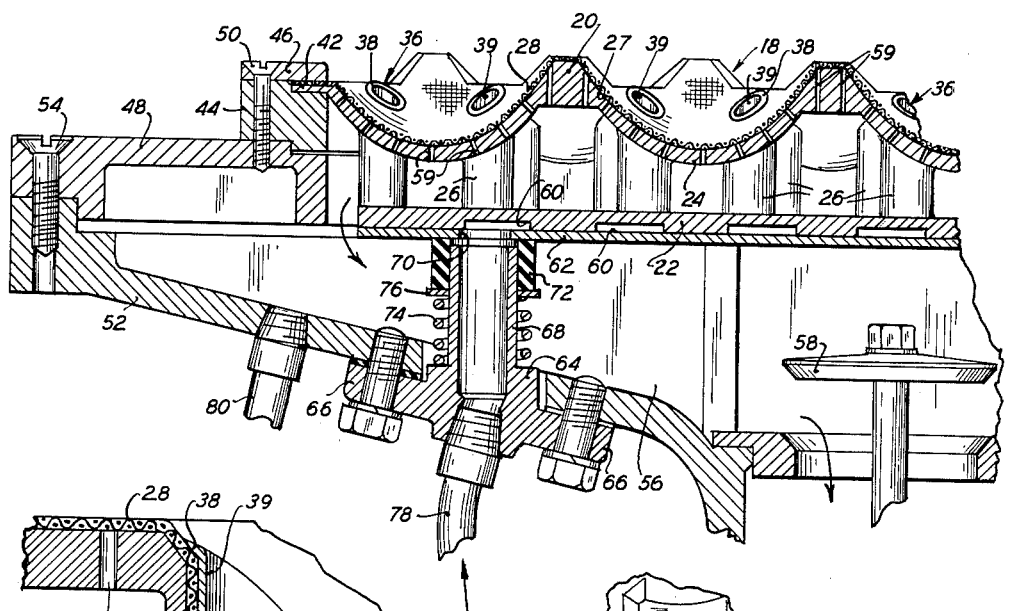
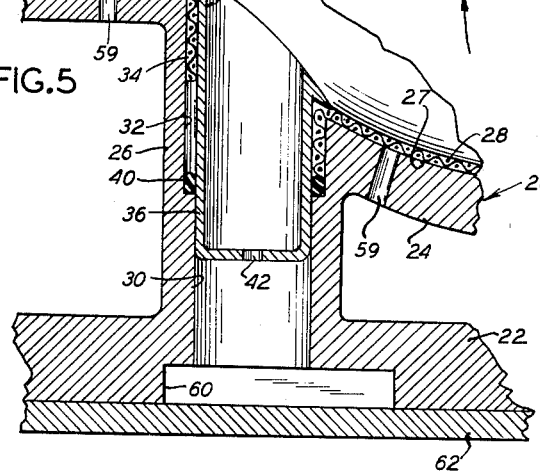
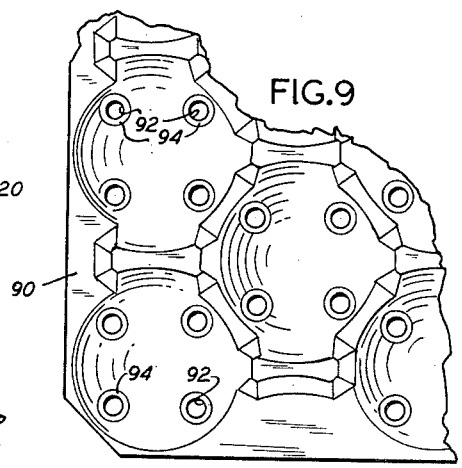
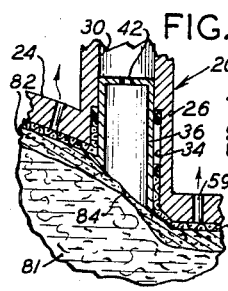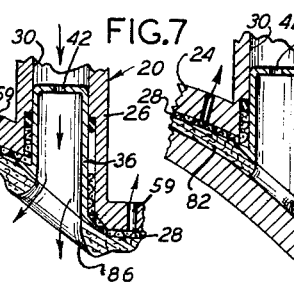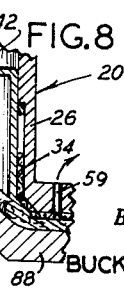
INVENTOR.
AMMON M. LEITZEL
BY
BUCKHORN, CHEATHAM & BLORE
ATTORNEYS July 24, 1962 A. M. LEITZEL 3,046,187
APPARATUS AND METHOD FOR MAKING MOLDED PULP
ARTICLES HAVING HOLES THERETHROUGH
Filed Nov. 3, 1958 3 Sheets-Sheet 3

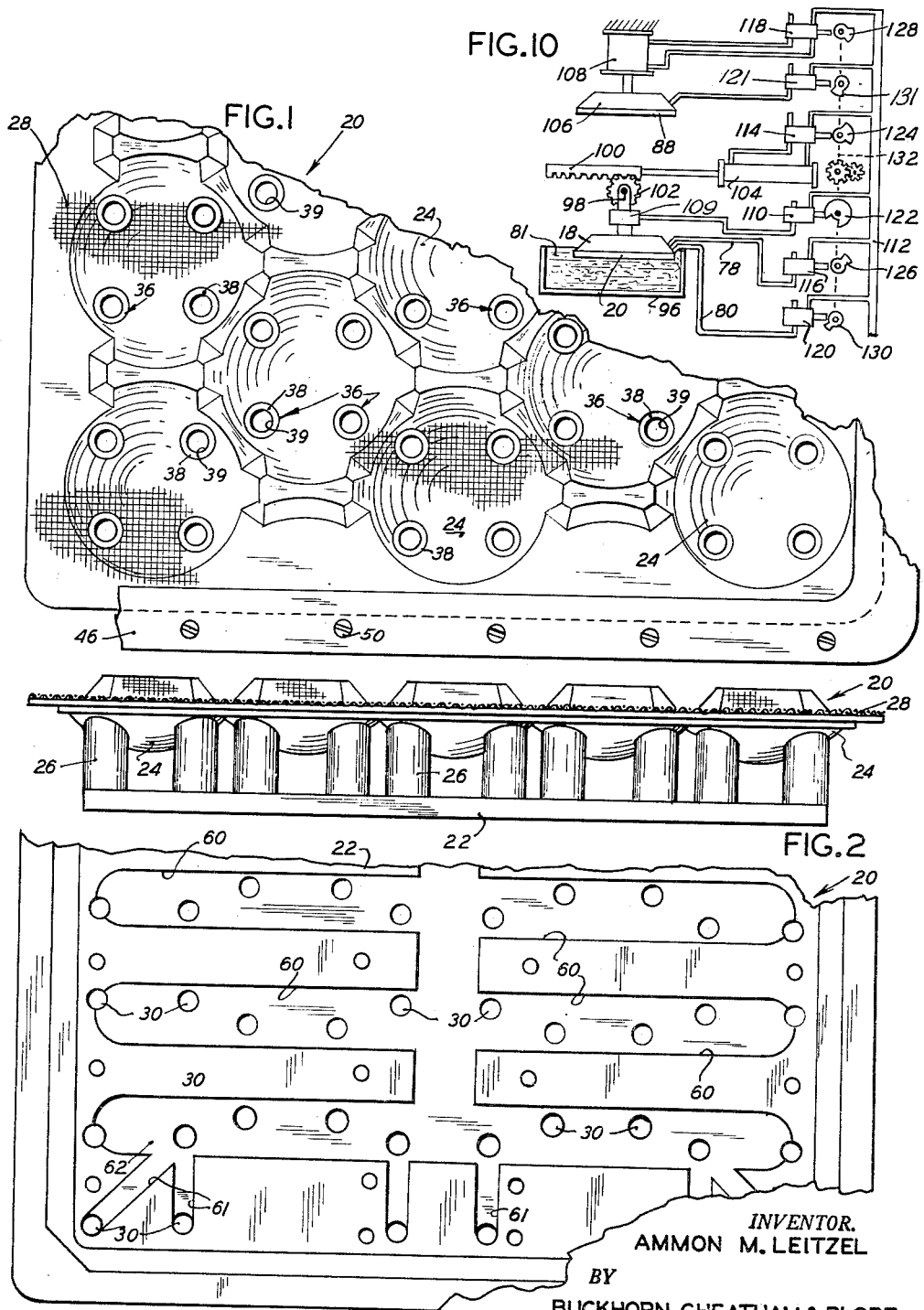

INVENTOR.
AMMON L. LEITZEL
BY
BUCKHORN, CHEATHAM & BLORE
ATTORNEYS

United States Patent Office 3,046,187
Patented July 24, 1962

3,046,187
APPARATUS AND METHOD FOR MAKING MOLDED PULP ARTICLES HAVING HOLES THERETHROUGH
Ammon M. Leitzel, Portland, Oreg., assignor to Pacific Pulp Molding Company, Portland, Oreg., a corporation of Washington
Filed Nov. 3, 1958, Ser. No. 771,667
9 Claims. (Cl. 162—228)

This application is a continuation-in-part of my copending application, Serial No. 677,544, filed August 12, 1957, and now abandoned.

This invention relates to an apparatus and method of making molded pulp articles having holes therethrough and more particularly to a method and apparatus in which an article is formed by collecting and compressing a layer of pulp fibers upon the surface of a suction die and one or more holes extending through the layer of pulp are produced during forming of the article.

In the making of molded pulp articles, such as trays for packing fruit it is frequently desirable to have a plurality of holes extending through such trays in order to provide ventilation between the various layers of fruit when the trays are employed for separating such layers of fruit in a box, carton or other container. The holes may be in portions of the tray having inclined or curved surfaces and forming of such holes in the trays in an economical manner has not proved to be simple. Die cutting or drilling of the holes after the molded articles have been otherwise completed has been proposed but elaborate machinery is necessary for such operations and for die cutting operations the making of special dies for special shaped articles is difficult and expensive. Also the time consumed in a separate hole forming operation has caused such mechanical cutting or drilling operations to represent a major portion of the cost of the trays. Attempts have also been made to form the holes in the trays during the molding operation but again the solution of the problem has not been simple. Merely leaving blank spaces on the surfaces of the molds which are not subjected to suction has not been successful, since the pulp tends to cover such blank spaces in at least a thin layer and previous attempts to employ air pressure to pierce the layer of pulp after formation have either been unsatisfactory or have required intricate and expensive apparatus including movable valve members disposed at the surfaces of the dies upon which the layer of pulp is collected.

In accordance with the present invention, it has been found that the desired holes can be rapidly and easily formed in the pulp articles referred to by providing apertures of the size of the desired holes in the surface of the suction molds upon which the layer of pulp is collected, connecting a conduit to such apertures through the molds, and employing restricting means or restricted orifices in the conduits through which jets of air or other gas are discharged toward the apertures while the mold surface is in the slurry or immediately after the mold surface is removed from the slurry. Merely connecting the apertures with conduits from a source of compressed gas without the restricted orifices has not proved practicable since an excessive amount of gas is required to form holes of appreciable size and the resulting conduits or ducts in the molds occupy excessive space. By providing the restricted orifices discussed above in conduits leading to the apertures in the mold surface, and spacing these orifices from the apertures so as to produce a solid or non-hollow expanding turbulent jet of gas, any layer of pulp extending over or partly over the apertures is cleared from the apertures and a thickened rim of pulp is produced around the apertures, provided that the jets are produced before any substantial amount of water has been removed from the pulp layer. Suction through the mold surface is continued during the employment of the jets and such continued suction after the apertures have been cleared causes the layer of pulp to be consolidated and packed into an adherent structure. Preferably the resulting article is pressed between the surface of the suction die and a mating die to smooth the layer of pulp and compact it before the formed article is discharged from the suction die. The pressing operation further compacts the thickened rim of pulp around the apertures into a reinforced rim around the holes in the molded pulp article. The hole forming operation takes place in a very short period of time during the movement of the suction mold from the slurry to the pressing position in which it is engaged with the mating mold referred to. Thus, no more time is required to produce trays having holes therein than producing trays without the holes.

It is therefore an object of the present invention to provide an improved apparatus and method of making molded pulp articles having holes formed therethrough.

Another object of the invention is to provide an apparatus and method of making molded pulp articles having holes therethrough in which a jet of air is employed in conjunction with apertures in the pulp collecting surface of a suction mold to clear such apertures of any pulp extending over or partly over the apertures.

Another object of the invention is to provide an apparatus for producing molded pulp articles having holes therein in which a suction mold having apertures in its pulp collecting surface is provided with means for directing a jet of air outwardly through each of such apertures from the interior of the mold to clear the apertures and to provide holes in the layer of pulp on such surface having thickened rims, the jets being directed toward the apertures from positions spaced inwardly of the mold from the apertures.

Another object of the invention is to provide a method of making molded pulp articles having holes therein in which jets of gas are directed outwardly through apertures in a pulp receiving surface of a suction mold in a manner producing such holes in the partly completed article with thickened rims of pulp around the holes and such rims of pulp are later compressed to provide reinforced rims around such holes.

A further object of the invention is to provide an improved method and apparatus for making molded pulp articles having holes therethrough in which apertures are provided in the pulp receiving surface of a suction mold and the holes are produced in a layer of pulp collected on the surface of such mold and partly covering the apertures, the holes being produced by a solid, or non-hollow expanding turbulent jet of gas from the interior of the mold during and immediately after removal of the surface containing the layer of pulp from a pulp slurry.

Other objects and advantages of the invention will appear in the following description of preferred embodiments of the invention shown in the attached drawings of which:

FIG. 1 is a view of a portion of a suction mold member in accordance with the present invention showing the pulp collecting surface of the mold member and a clamping member therefor partly broken away;

FIG. 2 is a side elevation of the suction mold member of FIG. 1 with the mold clamping member omitted;

FIG. 3 is a partial bottom view of the suction mold member of FIG. 2 looking upwardly in FIG. 2;

FIG. 4 is a partial vertical section of a suction mold showing a part of the mold member of FIGS. 1 to 3 mounted in a mold structure;

FIG. 5 is a fragmentary vertical section on an enlarged scale through a portion of the mold member of FIGS. 1 to 3;

FIG. 6 is a view similar to FIG. 5 on a smaller scale showing a fragment of the mold member inverted and the pulp collecting surface thereof immersed in a pulp slurry;

FIG. 7 is a view similar to FIG. 6 showing the fragment of the mold member after being withdrawn from the slurry and showing the pulp cleared from an aperture in the mold;

FIG. 8 is a view similar to FIG. 6 showing fragment of a mating mold applied to the mold member;

FIG. 9 is a fragmentary plan view of a molded pulp article made in accordance with the present invention;

FIG. 10 is a diagrammatic view of a molding apparatus illustrating one manner of employing the mold of the present invention.

Figure 11:
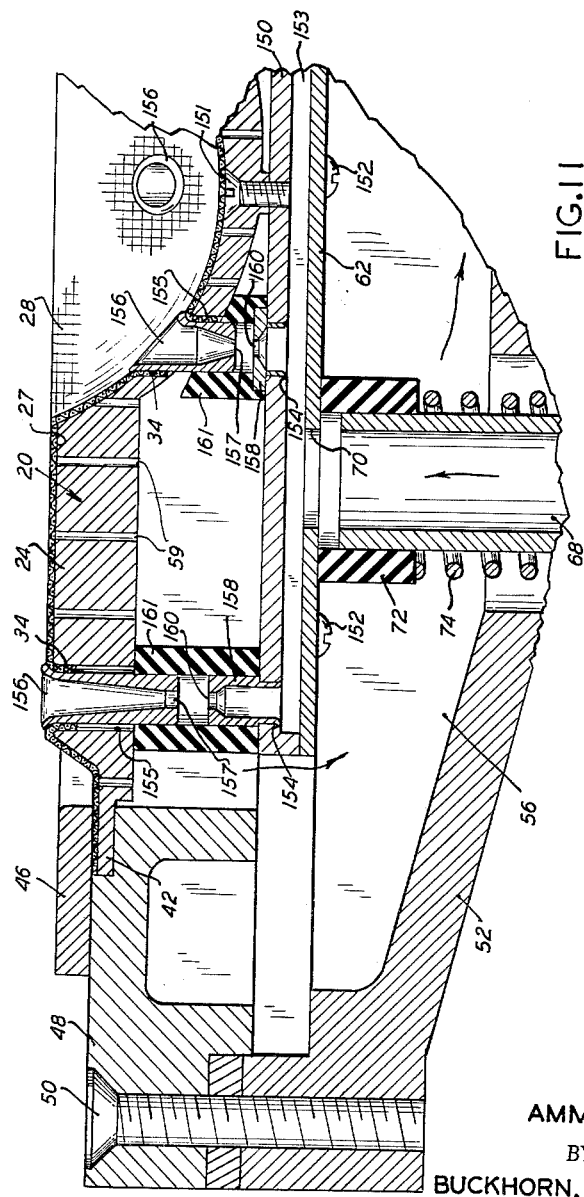
FIG. 11 is a partial vertical section similar to FIG. 4 and on a further enlarged scale, showing details of a modification of the present invention.

Referring more particularly to FIGS. 1 to 4 of the drawings, the apparatus of the present invention includes a suction mold 18 provided with a mold member 20 in the form of a casting having an integral backing portion 22 and an article forming portion 24 spaced from and supported on the backing portion 22 by a plurality of integral tubular strut members 26. The article forming portion 24 of the mold member 20 has an external surface 27 conforming approximately to the shape of the molded pulp article to be made, in this case, a tray for holding fruit in desired position in a packing box or carton. Such external surface is covered by a screen 28 formed to fit such surface. The tubular strut members 26 each have a bore 30 formed therein which extends through the external mold surface 27 of the article forming portion 24. The bore 30 has a counter bore 32 (FIG. 5) of larger diameter extending inwardly from the surface 27 and the screen 28 has an annular portion 34 extending down into the counter bore 32, such annular portion 34 being formed by slitting the screen above the counter bore and forcing it down into the counter bore. Each bore 30 has a tubular member 36 inserted therein from the article forming side of the mold member. The tubular member 36 has an outwardly extending rim 38 about its end exposed at the pulp collecting surface of the mold, such rim engaging the screen 28 to hold it snugly in engagement with the surface 27. The rim 38 has a beveled exposed surface so that its contour blends smoothly into the exposed surface of the screen 28 and the interior surface of the tubular member provides an aperture 39 in the pulp collecting surface of the mold. In order to retain the tubular member 36 in the bore 30 and seal its exterior surface to the interior surface of the bore, a flexible O ring 40 is positioned in the counter bore 32 so as to engage the exterior surface of tubular member 36 and the interior surface of the counter bore. The tubular member also has its bottom portion partially closed to provide a restricted orifice 42.

The mold member 20 has the peripheral edge 43 of its article forming portion 24, with the peripheral edge of the screen 28 superimposed thereon, clamped between a support member 44 (FIG. 4) extending around the periphery of the mold member and a clamping member 46 also extending around the periphery of the mold member. The support member 44 is in the form of a rectangular rim and the same is true of the clamping member 46, the supporting member 44, in the particular structure shown, being an adapter for securing the particular mold member 20 of the present invention to a mold structure. The mold member 44 is secured to a mold support plate 48 by means of screws 50, the clamping member 46 also being clamped against the support member 44 by the screws 50. The mold plate 48 is also in the form of a rectangular rim extending around the periphery of the mold member 20 and such mold plate is secured to a mold backing plate 52 in any suitable manner such as the screws 54.

The mold backing plate 52 is spaced from the mold member 20 to provide a suction chamber 56 which may be connected to or disconnected from a suitable source of vacuum by means of a poppet valve 58. The space between the article forming portion 24 of the mold member and the backing portion 22 of such member is in communication at its edges with the suction chamber 56. The article forming portion 24 of the mold member 20 has a plurality of small apertures or ducts 59 extending therethrough so that suction produced in the vacuum chamber 56 is also produced at the surface 27 upon which the screen 28 is positioned.

The backing portion 22 of the mold member 20 has a plurality of grooves 60 (FIG. 4) formed in its rear surface, such grooves 60 being interconnected as shown in FIG. 3. All of the bores 30 intersect one of the grooves 60 or are connected thereto through auxiliary narrower grooves 61. As shown in FIGS. 4 and 5, the backing portion 22 has a sealing plate 62 secured thereto so that the grooves 60 become ducts communicating with the bores 30 and thus with the restricted orifices 42.

The ducts formed by the grooves 60 may be connected to a source of gas under pressure by means of a connecting element 64, shown in FIG. 4, having a flange portion 66 secured to the external surface of the backing plate 52 for the mold and also having a tubular portion 68 extending through a hole in the backing plate 52 to a point adjacent a hole 70 in the sealing plate 62 and communicating with one of the grooves 60. A tubular element 72 of resilient material is positioned around the upper end of the tubular element 68 and is resiliently pressed against the surface of the sealing plate 62 around the hole 70 by a compression spring 74 extending between the flange portion 66 of the connecting element 64 and a washer 76 engaging the end of the resilient tubular member 72. The connecting element 64 has a conduit 78 connected thereto for gas under pressure and it will be apparent that such gas can be delivered under pressure through the tubular element 68 and through the grooves 60 and bores 30 to the orifices 42.

The vacuum chamber 56 may also have provision for connecting to a source of gas under pressure, for example, by the pipe 80 shown in FIG. 4, such connection being useful for removing a molded article from the surface of the screen 28 after having been formed thereon and after the valve 58 has been closed. That is to say, the valve 58 may be closed and gas under pressure introduced from the pipe 80 to force the formed article from the screen 28.

The operation of a suction mold of the general type described above without the hole forming apertures is well known. The action taking place adjacent the hole forming apertures and jets of the present invention is illustrated in FIGS. 6 to 8 inclusive. In FIG. 6, the mold member 20 has been dipped in a pulp slurry 81 and a vacuum produced through the ducts 59 to cause a layer 82 of pulp to be built upon the screen 28. It has been found that the layer of pulp will extend at least partly over the apertures 39 provided by the tubular element 36 and in many cases, the layer will extend entirely over such aperture to provide a thin wall of pulp 84 when a layer of pulp 82 of the desired thickness has been built up. The mold is removed from the pulp slurry with the vacuum still applied through the ducts 59 and immediately before or upon clearing the surface of the pulp slurry, gas under pressure is forced through an orifice 42 to produce a jet of gas in the tubular member 36. The result is somewhat as shown in FIG. 7. A portion of the wet pulp may be blown completely free of the mold surface but some of the pulp is pushed back over the rim of the aperture or folded on itself to produce a thickened rim 86 of the pulp about the aperture. Continued suction through the ducts 59 thereafter partially dries and firms the formed layer of pulp. Any substantial delay in forcing the gas through the orifice 42 until the pulp surrounding the aperture is partly dried, results in tearing a jagged hole in the pulp layer rather than producing a smoothly formed thickened rim 86. The layer 82 of pulp is then pressed between the mold member 20 and a mold member 88 of a mating mold as illustrated diagrammatically in FIG. 8, while continuing the vacuum so as to produce a compacted molded article. A fragment of such compacted molded article 90 is shown in FIG. 9. Such article 90 has holes 92 therein and surrounding each of such holes is a smooth reinforcing rim 94 of pulp more densely compacted than the remainder of the molded article because of the thickened rim 86 (FIG. 7) which forms around the apertures in the mold member 20 during the hole forming operation in the pulp layer.

The diagrammatic view of FIG. 10 illustrates a possible manner in which the suction mold 18 of the present invention may be employed. The suction mold is shown as being dipped into a tank 96 containing a pulp slurry 81, the suction mold being supported on a shaft 98 so that it may be rotated through 180° by a rack 100 engaging a gear 102 on the shaft 98. When the rack 100 is driven to the right in FIG. 10 by an air cylinder 104, it will be apparent that such movement of the rack 100 will rotate the shaft 98 to position the suction mold beneath a mating mold 106 which may be moved downwardly by an air cylinder 108. The shaft 98 may be hollow and be connected to a source of vacuum (not shown) and the valve 58 of FIG. 4 may be air actuated by an air powered actuator 109 (FIG. 10) under control of a valve 110 by compressed air from a supply conduit 112. In the position of the mold shown in FIG. 10, the vacuum is applied to the interior of the mold to collect the layer of pulp above referred to upon the surface of the mold. The cylinder 104 is then supplied with compressed air from the supply conduit 112 under control of the valve 114 to reciprocate the rack 100 toward the right in FIG. 10 and rotate the mold to its upper position. Shortly before, or as soon as, the mold clears the slurry 81 in the tank 96, the valve 116 is actuated to supply air from the conduit 112 to the pipe 78 so as to blow air through the restricted orifices 42 (FIGS. 5 and 7) of the tubular members 36 to produce jets through the apertures 39 in the surface of the suction mold. The vacuum is continued during this operation. As soon as the suction mold reaches an upper position below the mating mold 106 of FIG. 10, the valve 118 supplies air to the cylinder 108 to lower the mating die 106 to thereby compress the layer of pulp upon the mold. The supply of gas through the orifices 42 is discontinued by the valve 116 before the mold 106 engages the suction mold. As soon as the compressing operation is completed, the valve 118 causes the mold 106 to be raised to separate the two molds. The completed article will remain on one mold or the other and the valves 120 and 121 are actuated to supply air under pressure to the interior of both of the molds to blow the molded article therefrom, the valve 120 being connected to the pipe 80 of FIG. 4. The various valves 110, 114, 116, 118, 120 and 121 are shown as being plunger valves actuated by suitable cams 122, 124, 126, 128, 130 and 131 on a suitably driven cam shaft indicated by the dotted line 132, although any other suitable control mechanism may be employed. Any suitable mechanism (not shown) can be employed to remove the molded article from the device.

The restricted orifices 42 in the tubular members 36 are spaced inwardly of the bores 30 from the surface 27 of the suction mold a sufficient distance that a solid or non-hollow jet of gas is formed and expanded to strike the layer of pulp on the mold not only at the center of the aperture but also adjacent the periphery of the aperture 39 provided by the tubular member 36. Such distance is not extremely critical although the orifice 42 cannot be immediately adjacent the aperture 39 nor can it be too far from such aperture. A structure in which the restricted orifice is approximately two diameters of the aperture from such aperture has been found satisfactory, as the jet can expand to fill the aperture. The result is to push back or fold over most of any pulp covering the aperture so as to form the thickened rim of pulp above described. The diameter of the restricted orifice may be small relative to the diameter of the aperture. As a specific example, the diameter of the orifice 42 may be approximately 1/16 of an inch and the diameter of the aperture may be approximately 5/16 of an inch. The restricted orifices 42 not only produce a solid, or non-hollow, expanding jet giving the action above described but enable a substantially uniform pressure to be built up throughout the ducts provided by the grooves 60 and bores 30 so that uniform action of a plurality of jets spaced throughout the area of the mold may be obtained. The gas employed to form the jets will ordinarily be compressed air but other gases under pressure can be employed.

While the restricted orifices 42 of the modification just described operate perfectly to produce the apertures in the molded pulp article, it has been found that the spaces within the tubular members 36 surrounding the orifices 42 may retain pulp fibers and become clogged thereby. Molds which are used intermittently may have hardened deposits of pulp formed in this manner which cannot be dislodged. Also, during the washing of the surface of the mold by a jet spray device, as is customary in molding operations, some of the fibers are forced through the orifices 42, and eventually some of the passages 60 may become clogged. As a result of this knowledge gained by operating experience, the modification disclosed in FIG. 11 has been devised whereby such objectionable features of the first modification have been eliminated. In the modification of FIG. 11, the parts of the molding apparatus, which remain identical with those previously described, have been given identical numbers throughout. The changes resulting in this modification are described as follows:

In lieu of an integral backing portion 22, this modification incorporates a separate backing plate 150 which is retained in association with the molding portion 24 by suitable screws 151, the heads of which are flush with the surface 27 of the molding portion. The sealing plate 62 is connected to the backing portion 150 by suitable screws 152. The space 153 between the backing portion 150 and the sealing plate 62 is wide open, with relatively few, spaced ribs (not shown) provided merely to prevent collapsing of the sealing plate 62 toward the backing member 150. The backing portion 150 is provided with a plurality of wide-open holes 154 through which gas or air may be blown in the manner previously described. The molding portion 24 is provided with a plurality of openings 155 in alignment with the openings 154 in the backing portion 150, into which openings the annular portions 34 of the screen 27 may be depressed as previously described. An orifice-forming member 156 is then forced into the opening 155, using substantial pressure whereby the friction fit afforded by the depressed portion 34 of the screen holds the orifice member in position. The interior surface of the orifice member tapers from the surface of the screen inwardly, terminating at a relatively large orifice 157. A nipple 158 is mounted in each of the openings 154 of the backing portion 150, projecting toward the inner end of the orifice member 156, which inner ends project below the inner surface of the molding portion 24. Each nipple 158 is provided with a shoulder which bears upon the upper surface of the backing portion 150 and a neck portion which passes through the opening 154 and is swaged to hold the nipple member in position. Each nipple 158 is provided with an interior passage terminating in a relatively large orifice 160 of substantially the same size as the orifice 157. The size and shape of the nipples 158 vary as required by the shape of the molding portion. A rubber hose connector 161 is mounted upon each nipple 158, the upper end thereof extending upwardly so that when the molding member 24 is assembled the hoses will embrace the projecting ends of the orifice members 156, whereby to provide conduits connecting the orifices 157 and 160.

The orifices 157 and 160 are of such size that fibers ordinarily employed in making molded pulp articles, even though relatively stiff, may pass therethrough with ease. Also, there are no shoulders in the interior of the orifice members 156. As a result, the slurry may freely enter the spaces beyond the orifices 157 as the mold is being immersed in a slurry of pulp, and likewise after the molded article has been removed from the mold the jet sprays utilized to wash the surface of the screen between molding operations may force fibers through the orifices. The slurry and fibers may even enter the space 153 to a considerable extent.

In utilizing this form of the invention it is preferred that the gas or air under pressure be forced through the orifices in order to produce the solid, or non-hollow, expanding jet of gas while the mold is still immersed in the slurry. This operation preferably commences while the mold is horizontally disposed at a uniform depth within the pulp slurry, so that uniform pressure will be applied through all of the members 156. However, with some forms of molding machines this cannot be accomplished but the device, nevertheless, operates efficiently, if, for example, the mold is at an inclination within the slurry. Sufficient restriction is supplied by the orifices so that the pulp will be cleared from the members 156 even if a portion of the mold should be lifted from the slurry before pressure is applied.

By reason of the construction of this modification, the interior passages of the mold are flushed between each molding operation so that accumulations of fibers are not deposited therein, thus increasing the life of a molding screen materially.

While I have disclosed preferred embodiments of my invention, it is to be understood that the details thereof must be varied and that the scope of the invention is to be determined by the following claims.

I claim:

1. Apparatus for forming a molded pulp article having a hole therethrough which comprises a suction mold having a mold surface in the shape of said article, a conduit extending through said mold to said surface and providing an unrestricted aperture in said surface of the approximate size of said hole, said conduit having a restricted orifice therein at a position within said mold and spaced from said aperture, means for immersing said surface of said mold in a pulp slurry, means for applying suction to said mold through said surface while said surface is immersed in said pulp slurry to cause the deposition of a layer of pulp fibers on said surface extending at least partly over said aperture, means for removing said surface of said mold from said slurry and means for blowing a gas through said orifice toward and through said aperture, said orifice being positioned to direct a jet of gas through said aperture to clear said aperture of pulp.

2. Apparatus for forming a molded pulp article having a hole therethrough, which comprises a suction mold having a mold surface in the shape of said article, a conduit extending through said mold to said surface and providing an unrestricted aperture in said surface of the approximate size of said hole, said conduit having a restricted orifice therein within said mold and spaced from said aperture, means for immersing said surface of said mold in a pulp slurry, means for applying suction to said mold through said surface to cause the deposition of a layer of pulp fibers on said surface extending at least partly over said aperture, means for removing said surface of said mold from said slurry, and means for blowing a gas through said orifice while said suction is still being applied, said orifice being positioned to direct a jet of gas through said aperture to clear said aperture of pulp.

3. Apparatus for forming a molded pulp article having a plurality of spaced holes therethrough, which comprises a suction mold having a mold surface in the shape of said article, conduits extending through said mold to said surface and providing spaced unrestricted apertures in said surface of the approximate size of said holes, said conduits each having a restricted orifice therein within said mold and spaced from the aperture of its conduit, means for immersing said surface of said mold in a pulp slurry, means for applying suction to said mold through said surface to cause the deposition of a layer of pulp fibers on said surface extending at least partly over said apertures, means for removing said surface of said mold from said slurry, and means connected to said conduits for blowing a gas through said orifices while said suction is still being applied, said orifice in each of said conduits being positioned to direct an expanded jet of gas through the aperture of its conduit to clear said apertures of pulp and build up thickened rims of pulp about said apertures.

4. Apparatus for forming a molded pulp article having a hole therethrough, which comprises a suction mold having a mold surface in the shape of said article, a conduit extending through said mold to said surface and providing an unrestricted aperture in said surface of the approximate size of said hole, said conduit having a restricted orifice therein within said mold and spaced from said aperture, means for immersing said surface of said mold in a pulp slurry, means for applying suction to said mold through said surface to cause the deposition of a layer of pulp fibers on said surface extending at least partly over said aperture, means for removing said surface of said mold from said slurry, and means for blowing a gas through said orifice while said suction is still being applied, said orifice being positioned to direct a jet of gas through said aperture to clear said aperture of pulp and form a thickened rim of pulp around said aperture, a mating mold for said suction mold, and means for pressing the resulting layer of pulp between said suction mold and said mating mold to smooth said resulting layer and compact said rim of pulp.

5. Apparatus for forming a molded pulp article having a plurality of holes therethrough which comprises a suction mold having a mold surface of the shape of said article, a plurality of conduits extending through said mold to said surface each providing an unrestricted aperture in said surface of the approximate size of said holes, said conduits each having an orifice therein within said mold, means for immersing said surface of said mold in pulp slurry, means for applying suction to said mold through said surface to cause the deposition of a layer of pulp fibers on said surface extending at least partly over said apertures, means for removing said surface of said mold from said slurry, duct means in said mold for supplying a gas under pressure to said conduits, said orifices being of smaller area than the area of said duct means and being of smaller area than the area of said apertures and being spaced from said apertures to direct jets of gas through said apertures to clear said apertures and produce thickened rims of pulp around said apertures, a mating mold for said suction mold and means for thereafter pressing the resulting layer of pulp between said molds for smoothing said resulting layer and compacting said rims of pulp.

6. The apparatus defined by claim 1 wherein the conduit includes a tubular insert member having said unrestricted aperture in one end and said restricted orifice in the other end thereof, a pulp receiving screen covering the mold surface and extending a short distance into said conduit between the mold and said insert member, said insert member having an outwardly extending rim located at its end containing the unrestricted aperture for holding said screen tightly against said mold surface by engagement with said rim and for accurately spacing said restricted orifice from said surface for proper orientation of the gas jet.

7. The apparatus defined by claim 6 wherein the interior surface of the insert member tapers from the unrestricted aperture inwardly to the restricted orifice, a second tubular conduit member also having an unrestricted aperture in one end and a restricted orifice in the other end thereof, said second conduit member being positioned with its restricted orifice end adjacent the restricted orifice end of said insert member and said orifices being of substantially the same size which is such that fibers ordinarily employed in making molded paper articles may easily pass therethrough.

8. The method of forming a molded pulp article having a hole therein which comprises immersing in a pulp slurry a surface in the shape of said article and having an aperture therein of the approximate size of said hole, applying suction through said surface to form a layer of pulp on said surface extending, at least, partly over said aperture, removing said surface from said slurry, forming a solid expanding jet of gas at a position spaced from said surface on the opposite side thereof from said layer by passing a confined stream of gas through a restricted orifice smaller than said aperture, directing said jet through said aperture while said suction is still being applied and immediately after said removal of said surface from said slurry before the pulp around said aperture has partially dried, in order to cause said jet to clear the pulp from said aperture and to form a smooth hole in said layer with a thickened rim of pulp around said aperture, and thereafter pressing the resulting layer of pulp between said surface and a mating surface to smooth said resulting layer and to compact said thickened rim of pulp.

9. The method of forming a molded pulp article having a hole therein which comprises immersing in a pulp slurry a surface in the shape of said article and having an aperture therein of the approximate size of said hole, applying suction through said surface to form a layer of pulp on said surface extending, at least, partly over said aperture, removing said surface from said slurry, forming a solid expanding jet of gas at a position spaced from said surface on the opposite side thereof from said layer by passing a confined stream of gas through a restricted orifice smaller than said aperture, and directing said jet through said aperture while said suction is still being applied and immediately after said removal of said surface from said slurry before the pulp around said aperture has partially dried in order to cause said jet to clear the pulp from said aperture and to form a smooth hole in said layer of pulp with a thickened rim of pulp around said hole.

References Cited in the file of this patent
UNITED STATES PATENTS

| | | |
|---|---|---|
| 1,158,634 | Chaplin | Nov. 2, 1915 |
| 1,880,458 | Morris | Oct. 4, 1932 |
| 2,225,134 | Skolnik | Dec. 17, 1940 |
| 2,923,352 | Leitzel | Feb. 2, 1960 |
| 2,923,654 | Comstock | Feb. 2, 1960 |